United States Patent
Vyawahare et al.

(10) Patent No.: US 8,002,235 B2
(45) Date of Patent: Aug. 23, 2011

(54) ELECTRICALLY ACTUATED VALVES MADE FROM SHAPE MEMORY ALLOY WIRES EMBEDDED IN ELASTOMER

(75) Inventors: Saurabh Vyawahare, Pasadena, CA (US); Suresh Situala, Pasadena, CA (US); Dvin Adalian, Alexandria, VA (US); Axel Scherer, Laguna Beach, CA (US)

(73) Assignee: California Institute of Technology, Pasadena, CA (US)

( * ) Notice: Subject to any disclaimer, the term of this patent is extended or adjusted under 35 U.S.C. 154(b) by 733 days.

(21) Appl. No.: 11/853,531

(22) Filed: Sep. 11, 2007

(65) Prior Publication Data

US 2008/0173833 A1    Jul. 24, 2008

Related U.S. Application Data

(60) Provisional application No. 60/843,846, filed on Sep. 11, 2006, provisional application No. 60/959,998, filed on Jul. 18, 2007.

(51) Int. Cl.
    *F16K 31/00*    (2006.01)
(52) U.S. Cl. ...................... 251/11; 251/129.06
(58) Field of Classification Search .............. 251/11, 251/129.01, 129.06, 331
    See application file for complete search history.

(56) References Cited

U.S. PATENT DOCUMENTS

| 4,235,413 | A | * | 11/1980 | Baker | 251/11 |
| 5,325,880 | A | * | 7/1994 | Johnson et al. | 137/1 |
| 5,647,388 | A | * | 7/1997 | Butler et al. | 137/1 |
| 6,994,314 | B2 | * | 2/2006 | Garnier et al. | 251/129.06 |
| 7,198,248 | B2 | * | 4/2007 | Butera et al. | 251/11 |
| 7,331,563 | B2 | * | 2/2008 | Biehl et al. | 251/11 |
| 2002/0195579 | A1 | | 12/2002 | Johnson | |

FOREIGN PATENT DOCUMENTS

| EP | 1 481 705 A | 12/2004 |
| JP | 11 153234 A | 6/1999 |
| JP | 2004 204918 A | 7/2004 |
| WO | WO 99/38551 A1 | 8/1999 |

OTHER PUBLICATIONS

Quake, et al, From Micro- to Nanofabrication with Soft Materials, Science, Nov. 24, 2000, vol. 290, No. 5496, pp. 1536-1540.
Unger et al., Monolithic Microfabricated Valves and Pumps by Multilayer Soft Lithography, Science, Apr. 7, 2000, vol. 288, No. 5463, pp. 113-116.
Thorsen et al., Microfluidic Large-Scale Integration, Science, Oct. 18, 2002, vol. 298, No. 5593, pp. 580-584.

* cited by examiner

*Primary Examiner* — John K Fristoe, Jr.
(74) *Attorney, Agent, or Firm* — Milstein Zhang & Wu LLC; Joseph B. Milstein

(57) ABSTRACT

Microfluidic valves constructed from elastomeric materials as the valve body components and employing shape memory alloy in wire form as the valve actuator. Various configurations of individual valves having both normally open and normally closed states are described. Apparatus using such valves and providing logic functionality with fluidic logic outputs are discussed. Apparatus that can be used for materials processing at the nano- or micro-scale are presented. Various forms of logical control of valve arrays are explained.

14 Claims, 14 Drawing Sheets

Normaly Open Valve Geometry

- Shape memory wire "w" is inserted and fastened to the bottom of a punched hole

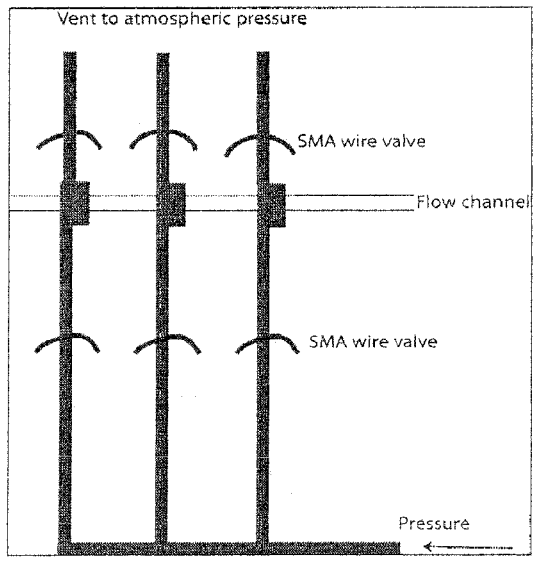
FIG. 14
FIG. 15
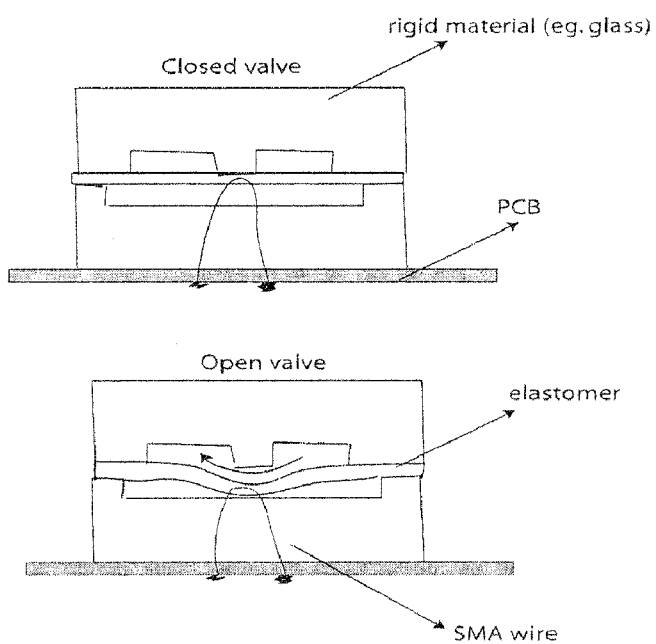
FIG. 16

ELECTRICALLY ACTUATED VALVES MADE FROM SHAPE MEMORY ALLOY WIRES EMBEDDED IN ELASTOMER

CROSS-REFERENCE TO RELATED APPLICATIONS

This application claims priority to and the benefit of co-pending U.S. provisional patent application Ser. No. 60/843,846, filed Sep. 11, 2006, and priority to and the benefit of co-pending U.S. provisional patent application Ser. No. 60/959,998, filed Jul. 18, 2007, each of which applications is incorporated herein by reference in its entirety.

STATEMENT REGARDING FEDERALLY FUNDED RESEARCH OR DEVELOPMENT

The U.S. Government has certain rights in this invention pursuant to Grant No. HR0011-04-1-0032 awarded by DARPA.

FIELD OF THE INVENTION

The invention relates to electrically actuated valves in general and particularly to electrically actuated valves that employ shape memory alloy (also referred to as "SMA") components.

BACKGROUND OF THE INVENTION

Shape memory alloys are metallic substances that significantly change their geometry when undergoing a phase transformation as their temperature is altered. Typically, the shape memory effect results from a phase transformation, which occurs at a specific temperature. In some cases, the alloy undergoes a transition from martensite (at lower temperatures) to austenite (at higher temperatures). If the metal is drawn to a wire, the length of such a wire can change significantly as the temperature of the metal is changed. One of the first shape memory alloys was a combination of nickel and titanium called Nitinol that was developed at the U.S. Naval Ordinance Laboratory in the 1960s. Many other metallic combinations exhibiting shape memory effects have since been developed. Some of the features of such alloys that are useful are control of the change in length with temperature, and obtaining a reproducible change in length or shape over a plurality of thermal cycles. The original shape is recovered when the temperature returns to the original value. In the form of wires, many shape memory alloys will shorten in length when heated beyond the phase transition temperature, often by more than 5% of the wire length. Wires are commercially sold in various sizes and are fairly inexpensive (typically a few dollars/meter). One commercial source of shape memory alloy wires is Dynalloy, Inc., 3194-A Airport Loop Drive, Costa Mesa, Calif. 92626-3405 (see www.dynalloy.com).

Elastomers are rubber like polymers that can often be stretched to several times their original dimension. They can also absorb appreciable compressive strain before yielding. In recent years soft-lithography has been used to make microfluidic devices using these polymers. Soft-lithography involves pouring the uncured polymer over a mold and then curing it, for example with heat or UV radiation. See for example "From micro- to nanofabrication with soft materials," Quake, S. R. & Scherer, A. (Nov. 24, 2000) Science, 290, 1536-1540. The elastomer can then be peeled off the mold and this can be used to create two dimensional structures like channels. By aligning and bonding two layers of these elastomers a pneumatic valve may be built. See, for example, "Monolithic Microfabricated Valves and Pumps by Multilayer Soft Lithography," Marc A. Unger, Hou-Pu Chou, Todd Thorsen, Axel Scherer, and Stephen R. Quake (7 Apr. 2000) Science 288 (5463), 113. [DOI: 10.1126/science.288.5463.113]) Because the elastomers can be molded to nanometer sizes highly dense fluidic devices can be built. See for example "Microfluidic Large-Scale Integration," Todd Thorsen, Sebastian J. Maerki, and Stephen R. Quake (26 Sep. 2002) Science [DOI: 10.1126/science.1076996])

Microfluidic structures and systems are useful for many purposes, including such applications as chemical and biochemical sensing systems, protein and chemical synthesis, and spectroscopy of ultra-small volumes. However, in conventional microfluidic systems, pneumatic pressure lines with external macroscopic valves have to be used to actuate the components such as valves and pumps that control or perform various microfluidic functions that need to occur to make the processes work.

There is a need for miniaturized valves useful in microfluidic systems, for example to permit such systems to be reduced in size and weight.

SUMMARY OF THE INVENTION

In one aspect, the invention features a microfluidic valve for controlling a flow of a fluid. The microfluidic valve comprises a substrate having at least two tie down points; adjacent the substrate, a microfluidic valve body constructed from an elastomeric material, the valve body having a flow channel configured to have therein a valve seat and a valve piston, the valve seat and the valve piston having a first relative position wherein the flow channel is in a first state and a second relative position wherein the flow channel is in a second state different from the first state; and an actuator constructed from a shape memory alloy material. The actuator is attached at two of the at least two tie down points. The actuator is configured to move the valve piston relative to the valve seat in response to an actuation signal so as to change the state of the flow channel from one of the first and second states to the other of the first and second states.

In one embodiment, the first state and the second state are selected from the group consisting of a fully open state, a partially open state, and a closed state. In one embodiment, the actuator is attached to at least one tie down location with solder. In one embodiment, the actuator constructed from the shape memory alloy material is a wire. In one embodiment, the actuation signal is an electrical signal. In one embodiment, the actuation signal is an illumination signal. In one embodiment, the microfluidic valve for controlling a flow of a fluid further comprises a block situated between the actuator and the flow channel, and the block is configured to transmit a force to the flow channel in response to the actuation signal. In one embodiment, at least one of the valve seat and the valve piston is a wall of the flow channel.

In another aspect, the invention provides a microfluidic apparatus for generating fluidic logic signals. The microfluidic apparatus comprises at least one microfluidic valve for controlling a flow of a fluid; a power supply configured to actuate the at least one microfluidic valve; a supply of fluid configured to provide a flow though the at least one microfluidic valve when at least partially open, and configured to provide a pressure at the at least one microfluidic valve when closed; and a control module configured to apply control signals to the power supply, and configured to supply control signals to the supply of fluid. The microfluidic apparatus provides fluidic logic signals as output in response to control signals applied by the control module.

In one embodiment, the microfluidic apparatus further comprises in at least one of the at least one microfluidic valve for controlling a flow of a fluid, a block situated between an actuator and a flow channel, the block configured to transmit a force to the flow channel in response to an actuation signal. In one embodiment, the microfluidic apparatus further comprises an actuator constructed from a shape memory alloy material, the actuator configured to operate a plurality of the microfluidic valves simultaneously in response to a single actuation signal. In one embodiment, one of the at least one microfluidic valve for controlling a flow of a fluid is configured to control a control channel; and the microfluidic apparatus further comprises a pneumatic valve responsive to a condition of the control channel, the pneumatic valve configured to control a state of a flow channel. The actuator of the one of the at least one microfluidic valve for controlling a flow of a fluid is situated at a distance from the flow channel, the distance calculated to limit a change in temperature of the actuator from affecting a thermal condition in the flow channel.

In yet another aspect, the invention relates to an apparatus for performing material processing operations in a microfluidic environment. The apparatus comprises at least one microfluidic valve for controlling a flow of a fluid; a power supply configured to actuate the at least one microfluidic valve; at least one supply of fluid configured to provide a flow though the at least one microfluidic valve when at least partially open, and configured to provide a pressure at the at least one microfluidic valve when closed, the supply of fluid containing material to be processed; and a control module configured to apply control signals to the power supply, and configured to supply control signals to the supply of fluid. The microfluidic apparatus provides processed fluid as output in response to control signals applied by the control module.

In one embodiment, the apparatus further comprises in at least one of the at least one microfluidic valve for controlling a flow of a fluid, a block situated between an actuator and a flow channel, the block configured to transmit a force to the flow channel in response to an actuation signal. In one embodiment, the apparatus further comprises an actuator constructed from a shape memory alloy material, the actuator configured to operate a plurality of the microfluidic valves simultaneously in response to a single actuation signal. In one embodiment, one of the at least one microfluidic valve for controlling a flow of a fluid is configured to control a control channel; and the apparatus further comprises a pneumatic valve responsive to a condition of the control channel, the pneumatic valve configured to control a state of a flow channel, wherein the actuator of the one of the at least one microfluidic valve for controlling a flow of a fluid is situated at a distance from the flow channel, the distance calculated to limit a change in temperature of the actuator from affecting a thermal condition in the flow channel.

In one embodiment, the apparatus further comprises a sensor configured to sense an output signal from the at least one processed fluid, the output signal representative of information derived from the processed fluid and having significance to a user of the apparatus; and an output module configured to perform at least one of recording and displaying the output signal representative of information derived from the processed fluid and having significance to a user of the apparatus.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIGS. 12, 13 and 14 are schematic diagrams of alternative indirect valving systems in plan view, according to principles of the invention;

FIG. 15 is a diagram showing an alternative valve design for a normally closed valve in elevation, according to principles of the invention;

FIG. 16 is a diagram showing the valve of FIG. 15 in the activated open state in elevation, according to principles of the invention;

DETAILED DESCRIPTION OF THE INVENTION

Figure 1:
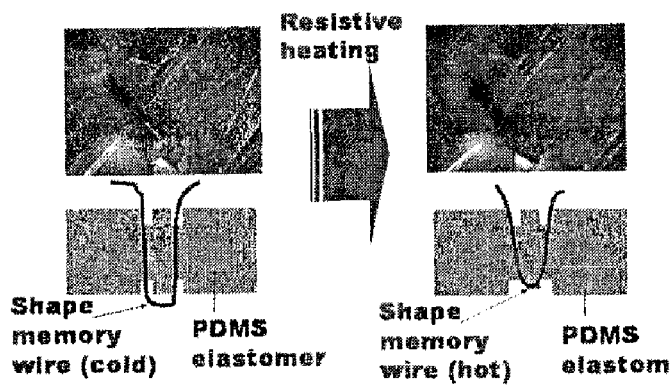
FIG. 1 is an optical micrograph image and a schematic side elevation description of a valve comprising a shape memory alloy wire embedded in a PDMS elastomer before and after heating of the wire, according to principles of the invention.

We will describe various miniature valves and microfluidic chip configurations using such valves hereinbelow. In general, a microfluidic chip comprises at least one channel, and often will have a plurality of channels. A valve is one basic unit that can act on a microfluidic channel. In various embodiments and configurations, a valve can allow a channel to be open, the valve can close the channel, or the valve can regulate a flow rate of fluid in the channel. In the examples that are now described, we consider principally valves that are either fully open to provide a flow defined by the microfluidic channel or that close completely to cut off flow of fluids through the microfluidic channel. In some cases, valves which are partially opened can be used to control the rate of flow of a fluid, in analogy to an analog signal. The fully open or closed states of a valve can be represented as the equivalent of a binary state in a digital computer, for example using 1 to represent "on" and 0 to represent "off." In such systems, flow rates can be controlled by controlling the ratio of duration of an open condition to a closed condition. It is conventional in electrical engineering to define a positive logic, in which an active signal corresponding to a active state such as "TRUE", 1, "on" or "High" is represented by a first voltage signal, and a complement state of "FALSE", 0, "off" or "Low" is represented by a second voltage signal, in which circumstance the first voltage signal has a voltage that is higher in voltage (more positive) than the second voltage signal. By comparison, negative logic can also be used in which the first voltage signal has a lower (more negative) voltage than the second voltage signal.

A valve may also be normally open or normally closed. The normally open valve requires power to be applied to prevent flow in the flow channel, or to close the valve. The normally closed valve requires power to be applied to open the flow channel. In the embodiments described hereinbelow, we shall consider without any loss of generality that the valves we will deal with are of the normally open variety, unless otherwise stated. In other embodiments, it is equally possible to perform all of the functions that will be described using the normally closed valve.

A fluidic system comprising valves and channels may be built to perform a particular task. Usually this means a certain number of valves need to be operated, for example, opened or closed, in a particular sequence, and possibly for different durations, in order to accomplish the desired task.

Applications of microfluidic devices include chemical and biochemical sensing systems, protein and chemical synthesis, and spectroscopy of ultra-small volumes. Depending on the application, the microfluidic devices of the invention can provide as output fluidic logic signals, processed materials (e.g., such as micro- or nano-quantities of chemicals or other substances), or information about the materials that are processed, such as the results of diagnostic tests, that can be of significance for a user. In these applications, it is useful to perform at least two functions in order to provide an integrated monolithic system that resembles a "laboratory on a chip." The first function includes combining different reagents in precise quantities, and flowing them through precise geometries for surface treatment or subsequent reaction. The second function includes pumping and mixing solutions within the reaction vessels. It has been common to use pneumatic valves and pumps to perform both of these functions.

Valves

We describe a method of making low-cost valves that can be directly actuated through application of small amounts of electrical currents and integrated into microfluidic systems. Multi-layer soft lithography along with a pneumatic multiplexing system has been developed to define microfluidic devices with many valves on a single chip.

Various shape memory alloys are known. When current is applied through a shape memory alloy wire, resistive heating can be used to change its temperature, according to the well-known equation $P=IV=I^2R$, where P is the power (heat) generated, I is the current, V is the voltage and R is the resistance of the wire. Therefore, the temperature of the wire can be directly controlled by the current that is applied to it. Indeed, the shape memory effect can be electrically controlled by injecting current through a wire from a battery or any other convenient electrical power supply. In one embodiment, as the current is applied, a wire is heated and shrinks in length, and when the current is no longer applied, the wire can cool below the martensitic transformation temperature and the wire will expand. In principle, any other method of controlling the temperature of the shape memory alloy could also be used, for example, injecting heat by use of a directed energy beam, such as illumination from a laser, or by any other convenient method.

Valves comprising a shape memory alloy wire and an elastomeric material are described. Both normally open and normally closed valves can be provided. We describe several geometries which use this shape memory effect within elastomeric materials to actuate valves and create a direct transduction mechanism for electrically controlled fluidic systems. The voltage and current levels needed are modest and large numbers of such elements can be integrated on a chip. Moreover, shape memory wires having diameters as small as 25 micrometers or less can be employed, which enables the integration of such transducers with sizes matching typical 50 micrometer-100 micrometer fluidic channels. We describe valves that can be integrated into peristaltic pumps by operating these in series or as individual isolation systems to control microfluidic manifolds such as multiplexing systems.

Figure 2:
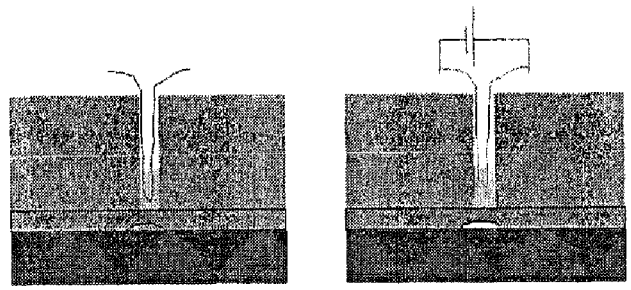
FIG. 2 is a schematic diagram showing a normally closed geometry using multilevel soft lithography bonding between the actuating (thick) PDMS layer on top of a fluidic (thin) layer, as shown in the left panel, according to principles of the invention.
Figure 3:
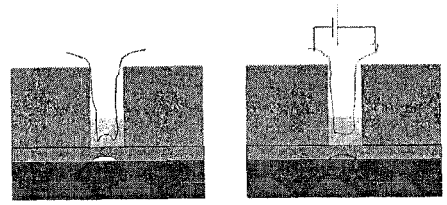
FIG. 3 is a schematic diagram showing a normally open geometry using a W wire geometry that pushes down as heat (electric current) is applied, thereby closing the normally open channel in the valve, according to principles of the invention.
Figure 21:
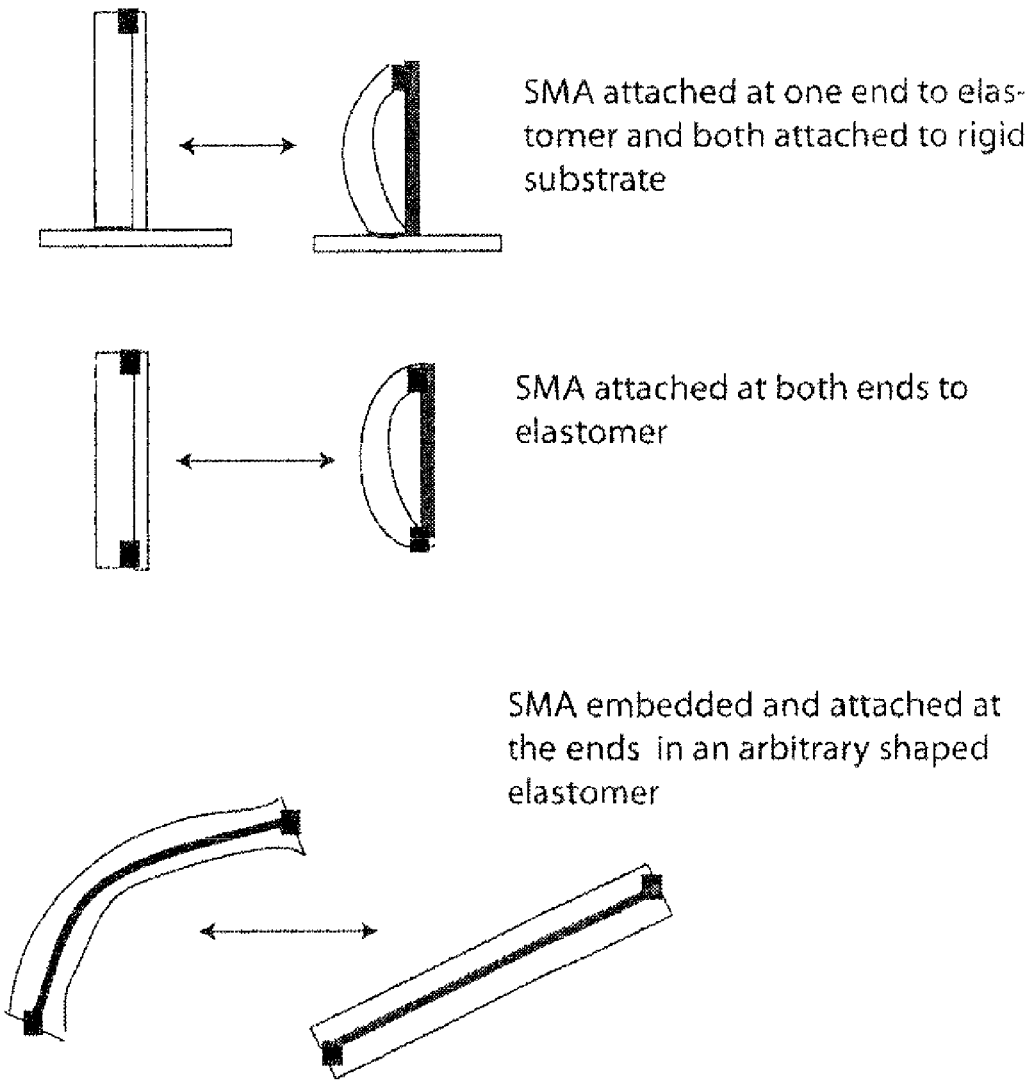
FIG. 21 shows three illustrative examples of how a shape memory alloy component can operate when attached to an elastomeric material at least at one point.

The use of elastomers along with shape memory alloys provides an excellent combination as the elastomers can be used to efficiently transfer the changes in geometries from the shape memory alloys onto a microfluidic system. FIG. 1, FIG. 2, and FIG. 3 show typical examples of elastomer/shape memory alloy systems that can be integrated to provide inexpensive valves. In these examples, different wire geometries are used to take advantage of the expansion/contraction behavior of the metal wire that then elastically deforms the elastomeric material surrounding the wire. As will become apparent, the ends of (or two points on) the shape memory alloy wire are held in specified locations, so that changes in dimension of the shape memory alloy wire result in mechanical forces being applied to valve components. In some instances, the specified locations are attachment points on relatively rigid objects such as printed circuit boards (PCBs), while in other instances at least one of the attachment points can be on the elastomer, so that a change in dimension of the wire causes the elastomer to change shape. See FIG. 21. In general, actuators using elastomers and SMA material can be constructed in many forms. In one form, SMA wires (or sheets, bars etc) may be either embedded at one or both ends in the elastomer or have one or both ends fixed to a solid substrate (like a PC board). The SMA material may also be completely embedded in the elastomer. The elastomer and the SMA material can be molded into any 3-D shape we and the SMA can be embedded inside or attached the elastomer at different points and will tend to straighten out when heated beyond the phase transformation, exerting forces on the elastomer. On cooling, the elastomer provides a convenient restoring force returning the wire to the original shape on cooling that is directly proportional to the distortion caused locally by the SMA, and thus enhancing the tendency of the SMA to return to the original shape, using the "shape-memory effect". These actuators may have uses in fields other than micro-fluidics, such as robotics, or prosthetics, to name two examples. For many applications, the elastomers additionally provide convenient thermal and electrical insulation.

FIG. 1 is an optical micrograph image and a schematic side elevation description of a valve mechanism comprising a shape memory alloy wire actuator embedded in a PDMS elastomer before and after heating. The valve in general will be provided with tie down locations where the shape memory alloy wire actuator can be attached. The valve has a body that includes a valve seat, a valve piston and a flow aperture or flow channel. In some embodiments, the valve seat and the valve piston are simply opposite sides or walls of the flow channel itself, and pinching the flow channel or otherwise distorting the flow channel cross section is a possible method of controlling the flow in the channel. As is common in mechanical valves, when the valve piston is mechanically in contact with the valve seat so as to close the flow aperture or flow channel, the valve is in a "closed" state, and when the valve piston is displaced from the valve seat so as to leave the flow aperture open, the valve is in an "open" state. The valve can be actuated using a signal having a binary condition, for example to drive the valve between an open state and a closed state. The wire is placed into the elastomer and additional elastomer is cured to cast it into place. Upon heating, the wire contracts, lifting the elastomer upwards in FIG. 1, changing the state of the valve from closed (on the left, where the flow channel is occluded) to open (on the right, where the flow channel is shown as open). Alternatively, the valve can be driven with a signal that is analog in nature, so that any two states of the valve can be achieved, from a fully open state, to fully closed state, and including a partially open state at any flow condition intermediate between fully opened and fully closed. There may need to be a feedback system to maintain the flow condition at the desired flow rate, for example taking into account the thermal effects of a flow of fluid in the flow channel. In other embodiments, the shape memory alloy may have a geometry other than a wire.

FIG. 2 is a schematic diagram showing a normally closed valve geometry using multilevel soft lithography bonding between the actuating (thick) PDMS layer on top of a fluidic (thin) layer, as shown in the left panel. As the wire is heated, the actuating layer will move upwards, opening the valve, as shown in the right panel.

FIG. 3 is a schematic diagram showing a normally open geometry using a W-shaped wire geometry that pushes down as heat (electric current) is applied, thereby closing the normally open channel in the valve.

Figure 4:
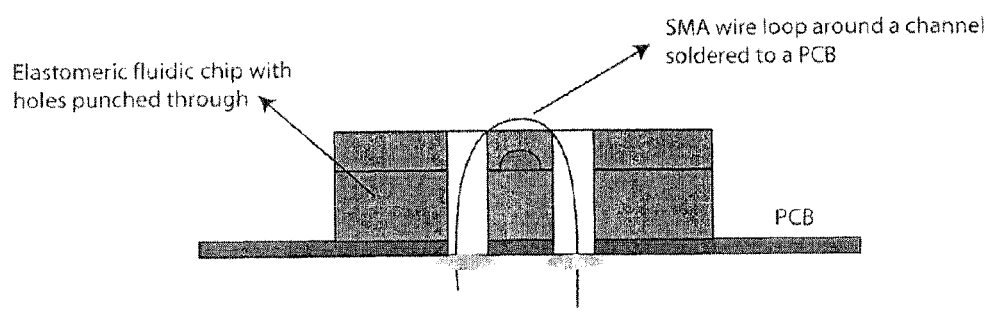
FIG. 4 is a diagram showing an alternative normally open valve design in side elevation, according to principles of the invention.

One embodiment of a simple valve comprises a completely enclosed channel in an elastomer and an inverted U loop of shape memory wire that can squeeze the channel shut when activated. An illustrative diagram of the valve is shown in cross section in FIG. 4. The wire is attached at its ends to a relatively rigid (or non-flexible) object so that the wire when shortened exerts force on the flow channel and the valve when closed can withstand the largest pressure gradient in the flow channel. A number of methods may be used to attach the wire including soldering, crimping, mechanical attachment such as by using screws and nuts or clamps, bonding the wire with epoxy, or any other convenient method. Soldering is particularly convenient because it allows for easy interfacing with electronic parts. This valve is straightforward but does have the disadvantage that the heated wire is close to the channel. In some embodiments, heat management could prove to be an issue depending on the application. The actuation can be done using a pulsed width modulated (PWM) signal from a control module, such as a microcontroller or general purpose programmable computer, on the same PCB board.

Figure 5:
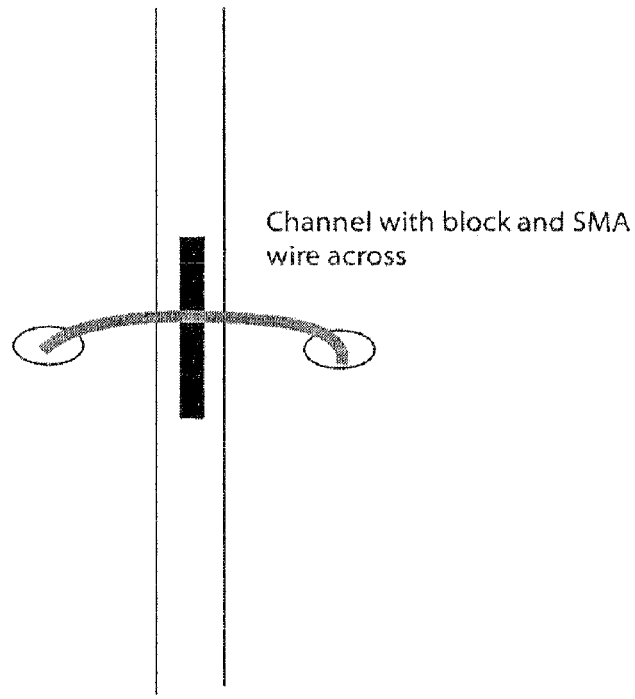
FIG. 5 is a diagram showing a normally open valve design in plan view, which comprises an additional block of material, according to principles of the invention.

FIG. 5 is a diagram showing an alternative embodiment of a normally open valve design in plan view, which comprises an additional block of material between the flow channel and the SMA wire. In some embodiments, the block can be smaller than the width of the flow channel. The dimensions of the block can be photolithographically defined. The block can be made with elastomers or other materials. The block is positioned along the flow channel and acts like a plunger that directs (and may concentrate) the force that is applied by the shape memory alloy wire actuator at the right spot to shut the channel. It also helps to protect the channel from being permanently deformed by keeping the wire a certain fixed distance from the channel. These direct valves have been tested and found to be able to withstand up to 10 psi pressure gradient. Observed failure modes include delaminating of the elastomer layers, and the SMA wire cutting into the elastomer and permanently closing the channel. With 3 mil diameter SMA wires a current of about ~100 mA is needed to activate the wire and operate the valve. For a 75 micron diameter wire having a few ohms of resistance per meter, the voltage required to operate the wire is small, and can be derived from the relation V=IR. In some instances, activation using a constant current source may have advantages, because the heat generated per unit length of wire will then be constant (or nearly so) independent of the length of the wire.

Figure 6:
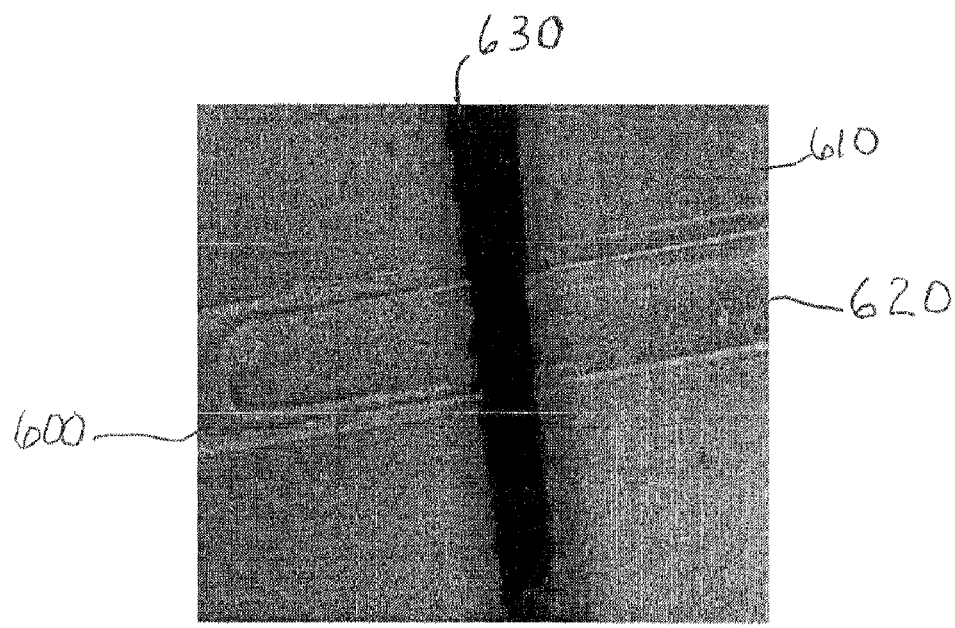
FIG. 6 is a substantially plan diagram based on a photomicrograph of a flow valve, according to principles of the invention.

FIG. 6 is a substantially plan diagram based on a photomicrograph of a flow valve that comprises a flow channel 600 defined in an elastomeric substrate 610, and having a block 620 situated adjacent a segment of the flow channel 600. The valve also comprises a shape memory alloy wire 630 that is fastened at two locations at the bottom of the elastomeric substrate 610 and that passes over the block 620 and the flow channel 600. When activated by having power applied to it, the shape memory alloy wire 630 is resistively heated and contracts, thereby shutting the normally open flow valve. The width of the microfluidic channels in the micrographs are approximately 100 microns and they are about 10 microns high.

In another geometry, one can make a flow layer channel that has a gap, e.g., the channel is intentionally discontinuous. The channel can be constructed in a thin layer of elastomer (PDMS). On a thick layer of PDMS, it is possible to punch holes that will align up laterally of the channel at the location of the gap. Then a U-shaped loop of wire with a bit of PDMS is placed in the punched holes. On actuation the wire will pull on the PDMS and lift the gap area allowing the previously discontinuous channel to connect up. This is a normally closed valve which opens up on actuation. A normally open valve can be constructed by introducing a w-shaped shape memory alloy wire. These valves can be made in SIFEL, PFPE and other solvent resistant material because the bonding between the thick layer and thin layer does not need to be very strong and one could make the thick layer out of PDMS (or some kind of epoxy/hard plastic).

Integration of Microfluidic Chips With Electronic Circuits on PC Boards

With this combination of devices we can produce sophisticated fluidic circuits with valves and pumps that may be treated as a "black box" component similar to electronic components like ICs. A fluidic chip like this may be attached to a PCB with the wires being the inputs and used very much like an IC. Using deconvolvers allows for considerable reduction in the number of control lines. Each fluidic chip can perform a certain function and several of these may be combined just in the same way electronic components are combined to produce useful electronic devices on a PCB.

Complete Fluidic System

Figure 7:
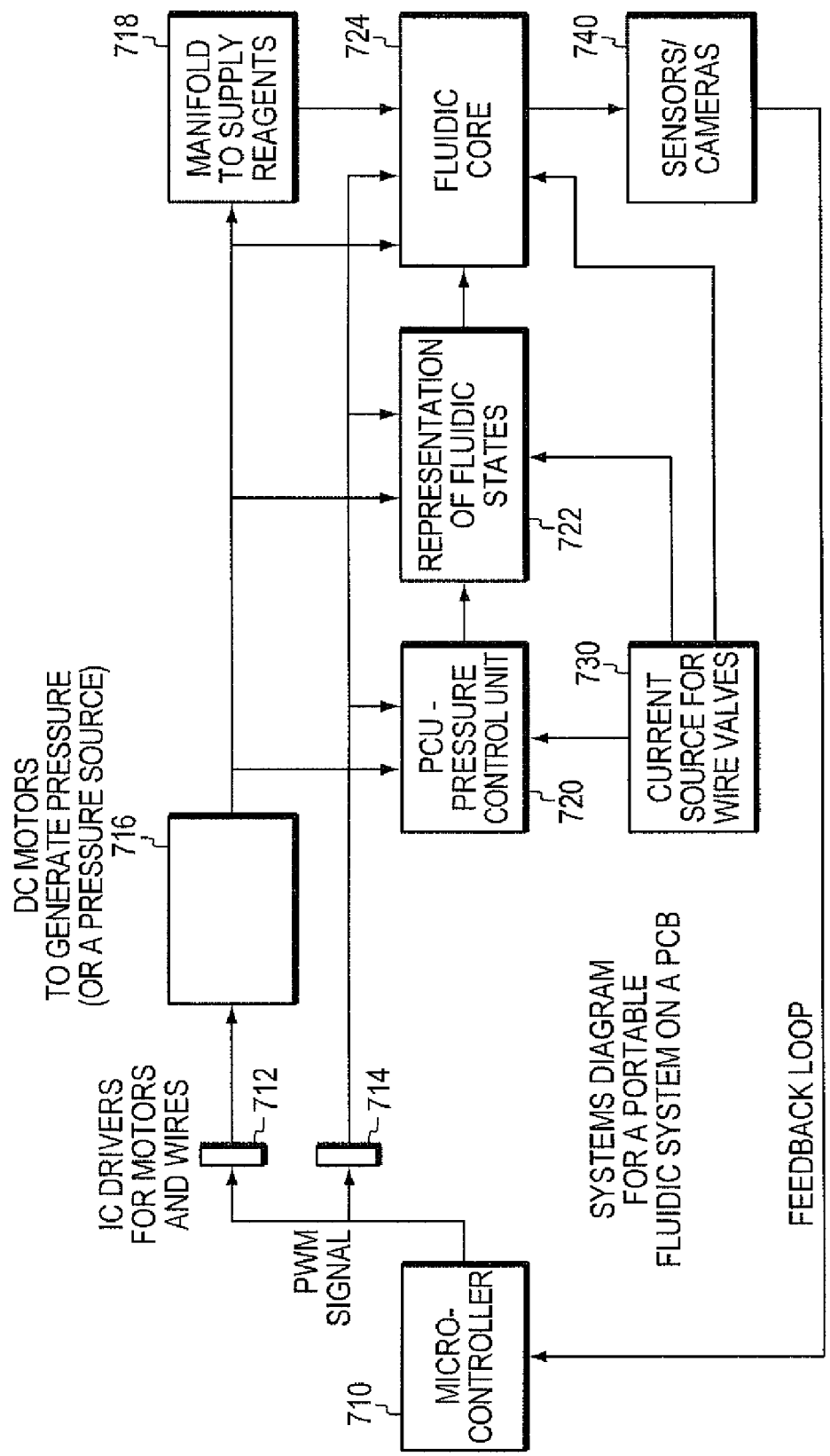
FIG. 7 is a diagram showing an illustrative systems diagram, according to principles of the invention.

FIG. 7 is an illustrative systems level diagram of a complete self contained fluidic system that may be designed with all these elements. In this illustrative system built entirely on a PCB, a microcontroller 710 supplies the necessary signals to IC peripheral drivers 712, 714. The drivers can be any convenient driver, such as Darlington arrays, MOSFET drivers or H-bridges. These drivers provide currents through the wire valves or miniature DC motors 716 that supply pressure or vacuum. For example, commercially available products use diaphragms to pump air.

The pressure control unit 720 is a set of control channels which allow pressure supplied through them based on the signal from the microcontroller. Any convenient kind of valves may be used for this. While it is not necessary to use SMA wire valves for this purpose, SMA wire valves are convenient and cost-effective in several instances. The pressure control unit 720 can generate a representation of fluidic states 722, which information is conveyed to the fluidic core 724 to set up a particular flow regime or logical state. It is also possible to have the IC controller for a PWM signal drive the pressure control unit 720, the representation of fluidic states 722, and the fluidic core 724. Also shown in FIG. & is a current source 730 useful to drive the shape memory alloy elements.

Figure 8:
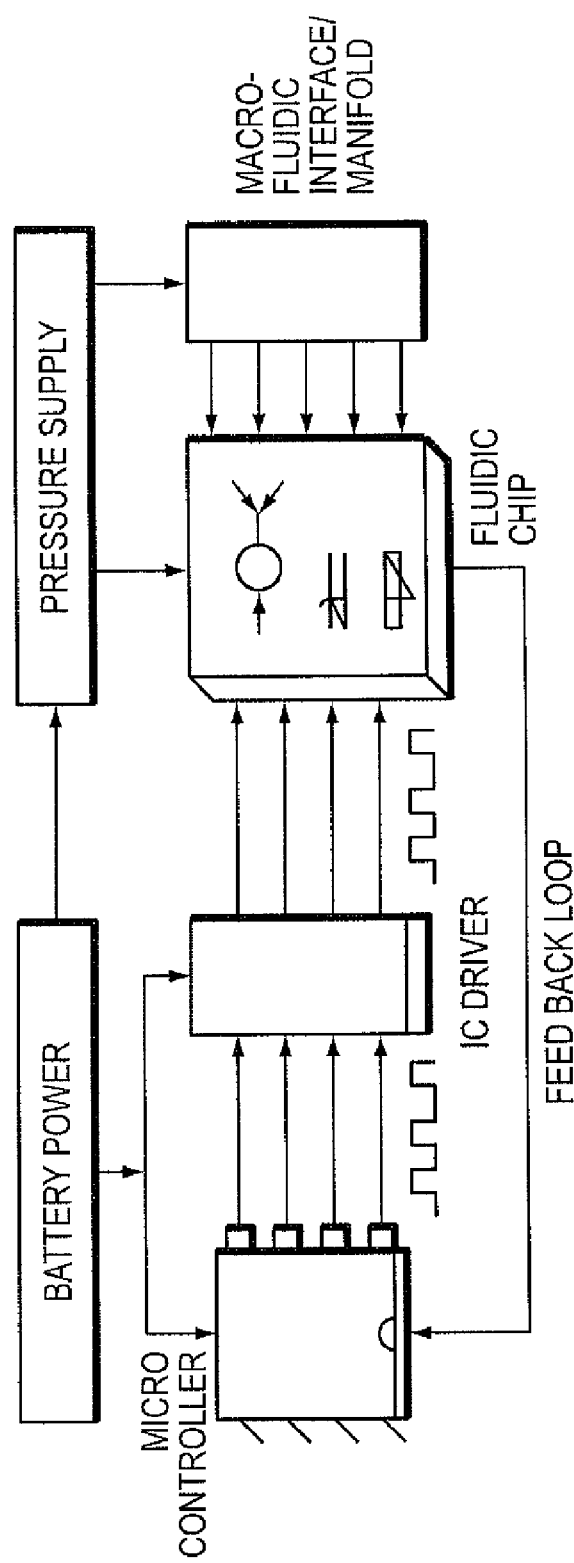
FIG. 8 is a diagram showing an alternative illustrative systems diagram, according to principles of the invention.

An alternative illustrative systems diagram is shown in FIG. 8. The pressure supply may not be required in all embodiments, but is shown for complete generality. In FIG. 8, a microcontroller operates one or more IC drivers, which in some embodiments are states that are applied according to a sequence which can be defined by a clock frequency. The IC controller signals are applied to selected SMA wires of selected valves in a microfluidic chip. The microfluidic chip may itself be a device of interest, or it may be a transducer for converting electrical logic signals to pneumatic logic, and the outputs from the microfluidic chip can be applied to a macrofluidic interface or manifold. As required, the pressure supply, for example a fluid under pressure in a tank, or a supply of fluid under pressure from a mechanical pump, can be used to provide fluid to either or both of the microfluidic chip and the macrofluidic interface or manifold. A power supply, such as a battery, is provided to run the electronics. An optional user input (not shown) can be provided to program or to instruct the system. To control several such wires, a Pulsed Width Modulation (PWM) signal with multiplexing in time for different wires can be used. This allows use of a single current source.

Pumps

Figure 9:
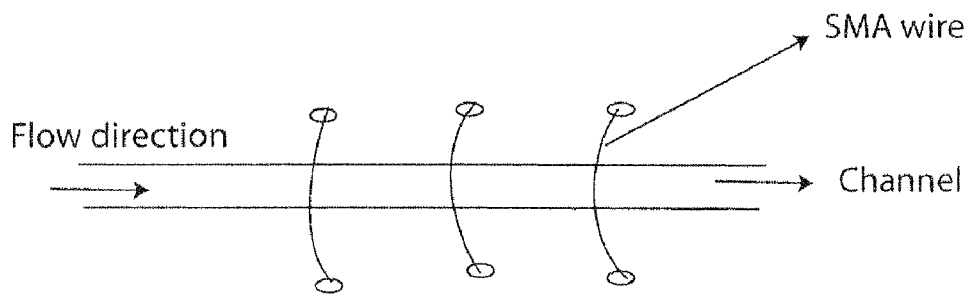
FIG. 9 is a diagram showing the use of a plurality of valves to make an electrically activated peristaltic pump, according to principles of the invention.

An extension of the valve concept is the use of a plurality (here, three) such valves to make an electrically activated peristaltic pump as shown in FIG. 9. The valves do not have to close completely to provide peristaltic pumping. The logic diagram for the pump of FIG. 9 is shown at the bottom of FIG. 9. In the diagram of FIG. 9 the value "1 " represents an activated (closed) valve and the number "0" represents a valve in its unactivated or normally open state. The pump comprises three valves, a leftmost valve, a center valve, and a rightmost valve. The state of the pump can be described by three values, one for each valve, that can take a value of either "0" or "1". The three values are expressed, starting with the leftmost valve, and representing the states of the three valves. We start with the condition 101 (step 0), representing closed, open and closed valves, which hold fluid measured by the volume of channel between the leftmost and rightmost valves. In one embodiment, to move fluid toward the right, one can apply the valve sequence "100" (step 1), "110" (step 2), "010" (step 3), "011" (step 4), "001" (step 5) and finally "101" (step 0) again. As the rightmost valve is opened (steps 1 through 3) and the leftmost valve is held closed (steps 1 and 2), fluid can move to the right but is prevented from moving to the left. Closing the center valve (step 2) pushes fluid rightward. Closing the rightmost valve (step 3) pushes fluid rightward again. The leftmost valve is opened at step 4 to admit fluid from the left. There are several types of peristaltic sequences possible, only one of which is explained here. One can also build such a peristaltic pump using more than three valves. A microcontroller and an IC driver can supply the necessary signals to control power to the shape memory alloy wires, and thereby the states of the valves.

These direct valves may exhibit local heating as a result of operating the SMA wire, which might be a disadvantage that may preclude their use in some microfluidic chips. In embodiments that require a wire to remain activated for a considerable period of time, heat may be transferred via conduction to the contents of a channel. For certain types of materials that could be present in a flow channel, e.g., enzymes and proteins, the heat that is applied might be unacceptable. There are various solutions to this problem. One solution might be to employ SMA wires that have a low enough transition temperature. Another possible solution could be to employ using indirect valves, which are described next.

Indirect Valves

In an indirect valve two channels are involved: a flow channel is used for the flow of a fluid of interest, which is controlled by a control channel that provides for the operation of a pneumatic membrane valve that controls the flow in the flow channel using fluid pressure as the motive force. An electrically operable direct valve employing a SMA wire is used to control the control channel pressure and/or state of the pneumatic membrane valve, effectively making control of the flow an indirect control. The electrically operated valve and its actuator can be situated at some distance from the flow channel, the distance calculated to limit a change in temperature of the actuator from affecting a thermal condition in the flow channel. A number of different configurations are possible.

Figure 10:
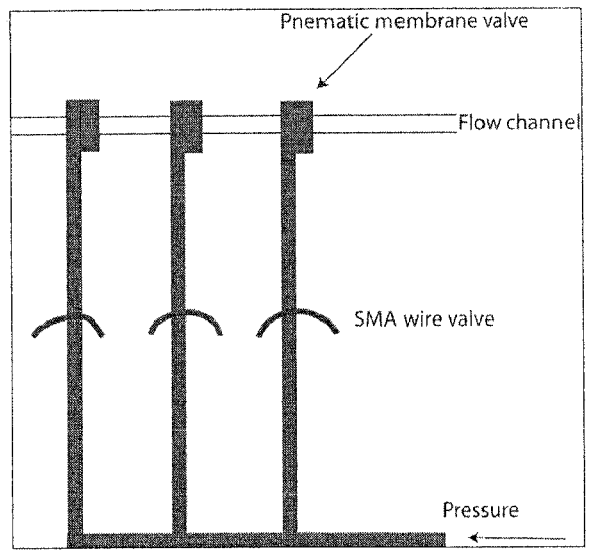
FIG. 10 is a schematic diagram of an indirect valving system in plan view, according to principles of the invention.

FIG. 10 is a schematic diagram of an indirect valving system in plan view. These fluid valves are very small compared to conventional solenoid based pressure valves that use relays. FIG. 10 illustrates one embodiment of a normally open flow valve. When the SMA wire valve (normally open) is actuated, the SMA wire valve is close, the pressure supplied y the pressure line cannot leave the pneumatic valve, and so the pneumatic valve is pressurized and closed. Most elastomers allow gases to diffuse through and so if the pneumatic valve is closed and the wire actuated, over time the high pressure trapped escapes with a certain time constant dependent on the geometry of the valve, the fluid composition, the geometry of the system and other possible factors. In practice it has been found the time for the pressure to be reduced by diffusion or leakage to be between fractions of a second and a few minutes.

Figure 11:
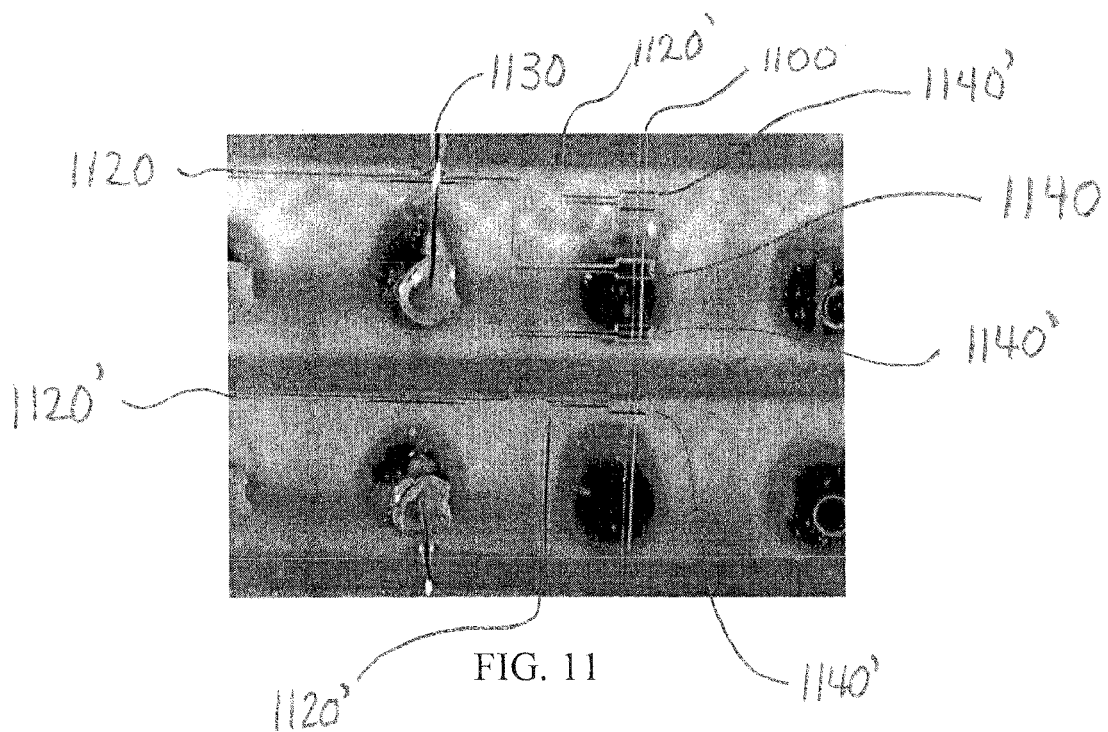
FIG. 11 is an illustrative micrograph of a section of the indirect valving system shown in FIG. 10, according to principles of the invention.

FIG. 11 is an illustrative micrograph of a section of the indirect valving system shown in FIG. 10. The image includes a flow line 1100 which runs from the top of the image toward the bottom of the image. The image also shows a control line 1120 with a shape memory alloy wire 1130 that is situated so as to operate a valve in control line 1120. Several additional control lines 1120' are visible in the image. At the place in the image where the control line 1120 and the flow line 1100 appear to cross, there can be seen a pressure operated valve 1140. Additional pressure operated valves 1140' are also visible where the additional control lines 1120' appear to cross the flow line 1110.

Figure 12:
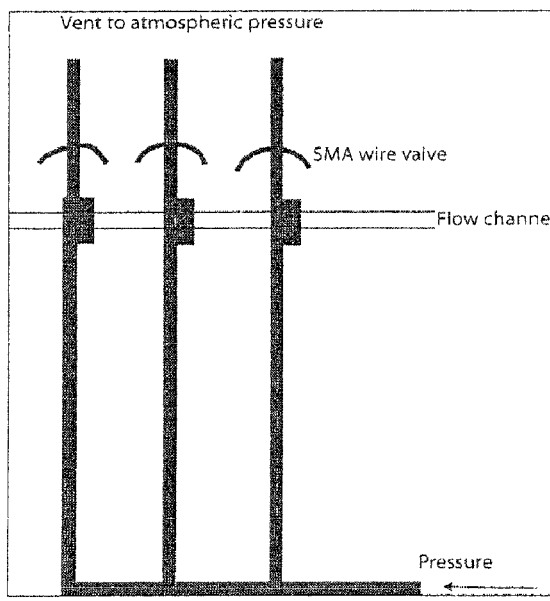
Figure 13:
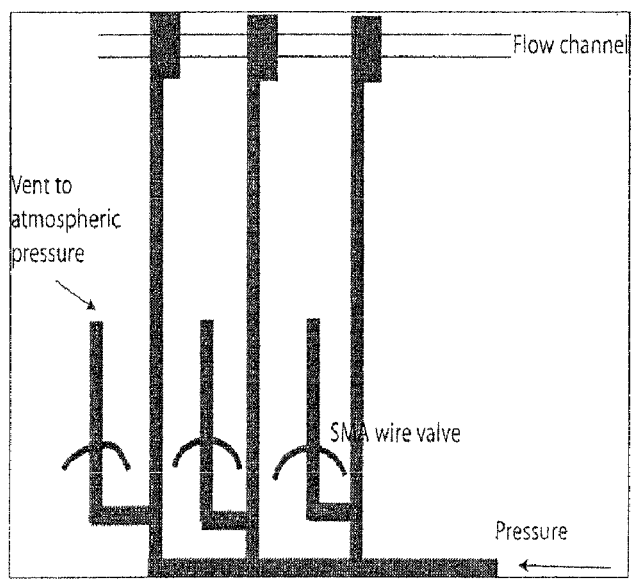

FIGS. 12, 13 and 14 are schematic diagrams of alternative indirect valving systems in plan view. FIG. 12 is a diagram that illustrates a valving system that has an exhaust valve comprising a SMA wire valve, which when transitioned between normal and active states changes the residual pressure on the pneumatic valve controlling the flow channel.

FIG. 13 is a diagram that illustrates a valving system that has a vent valve comprising a SMA wire valve, which when transitioned between normal and active states changes the residual pressure on the pneumatic valve controlling the flow channel.

FIG. 14 is a diagram that illustrates a valving system that has both an electrically operated input pressure SMA wire valve and an electrically operated SMA wire vent valve, which valves when transitioned between normal and active states change the residual pressure on the pneumatic valve controlling the flow channel. As illustrated by the truth table given below, in which the horizontal top row defines the state of the valve nearest the pressure inlet ("upstream valve") and the leftmost vertical row defines the state of the valve farther from the pressure inlet ("downstream valve"), it is possible to operate the configuration of FIG. 14 as a latch.

| Truth Table | | |
|---|---|---|
| | Upstream valve | |
| Down Stream valve | Off | On |
| Off | Valve open | Valve closed |
| On | Valve open | Latch (no external pressure needed) |

However this latch relies on the fact that once a channel is pressurized there it takes a certain amount of time before the pressure is lost—the latch is operational only for that time. The time can essentially be made infinite by using a non-volatile liquid instead of air in the control channel, for example, an ionic fluid that has a low permeability in the elastomeric material. The latch design can be simplified by just using one valve and a non volatile fluid, according to the schematic shown in FIG. 10.

Heat management is readily handled using these indirect valves. The contents of a channel are protected from the heating and cooling of the SMA wire. These valves also help in the miniaturization by separating the wire and pneumatic valves. The wires can be located far away from the actual flow channels and their valves. One can imagine a complicated dense fluidic circuit that has lines leading out to another part of the chip where the SMA wire valves are located. These wire valves then control the pneumatic valves in the fluidic circuit. The block construction previously described can be used in the SMA wire section of any of these indirect valve designs.

Another possible valve design for a normally closed valve is shown in elevation in FIG. 15 in the normal closed state and in FIG. 16 in the activated open state. In FIG. 15, the flow channel is pinched off between a pair of surfaces of rigid materials, made from materials such as plastic or glass. In FIG. 16, when power is applied to the SMA wire, the wire shortens and pulls one of the surfaces away from the other, thereby opening a channel for fluid to flow through.

Figure 17:
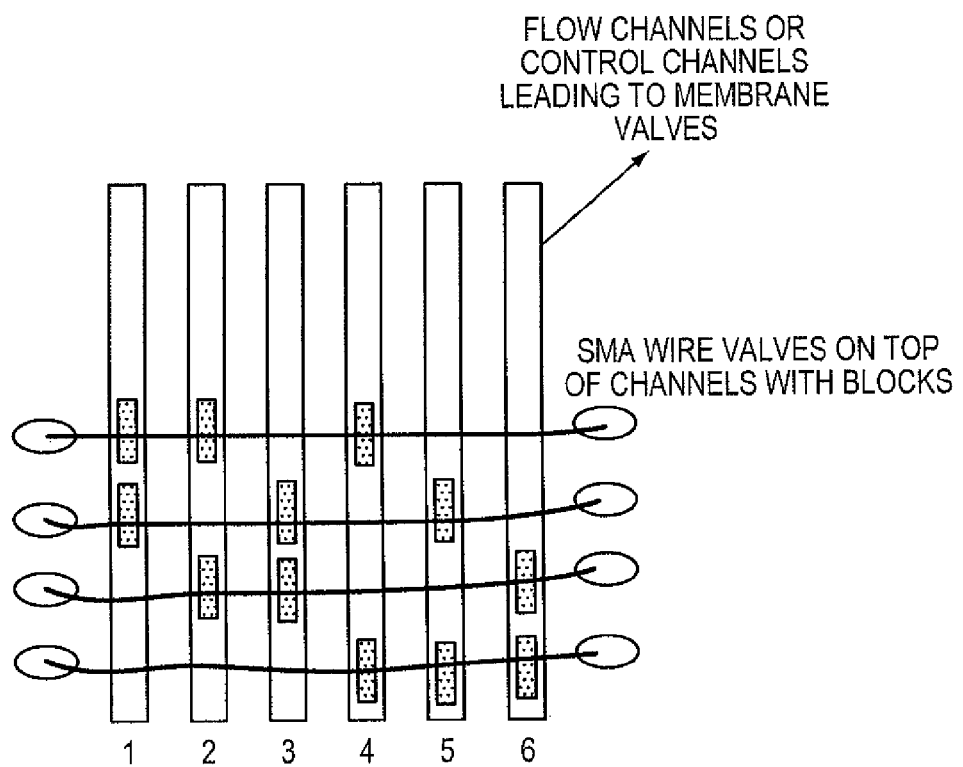
FIG. 17 is a diagram that shows in plan view several fluidic channels situated under a SMA wire, some of which comprise blocks, according to principles of the invention.

For certain applications one may want to control a plurality of channels with fewer SMA wires, or only one SMA wire. In FIG. 17 there are lithographically defined blocks adjacent some channels so that only channels that have blocks will close when the wire is activated. By omitting blocks adjacent some channels, as illustrated in FIG. 17 in plan view, one can have several fluidic channels situated under a SMA wire but only the ones with a block over them are affected when the wire is activated. This technique may be used with normally closed or normally open valves. It will now be shown how this technique may be used to create multiplexers.

Multiplexers

Figure 18:
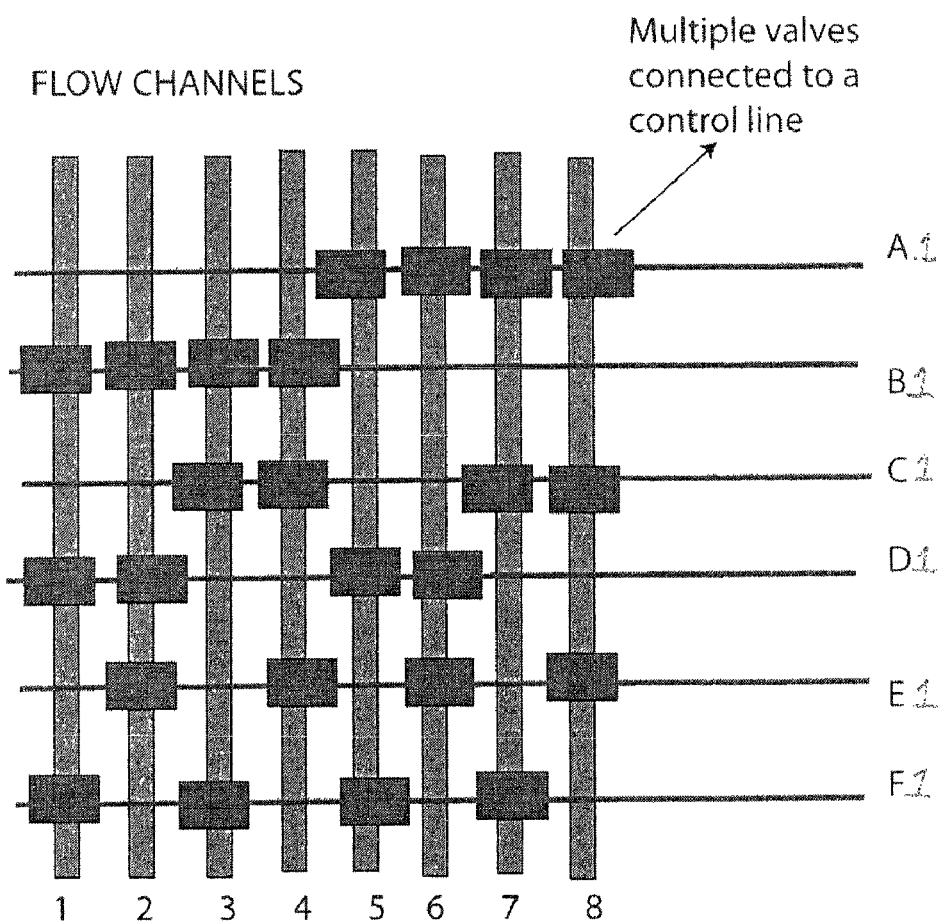
FIG. 18 is a schematic diagram that illustrates the use of valves in combination to control a plurality of microfluidic channels, using logarithmic multiplexing, according to principles of the invention.

FIG. 18 is a schematic diagram that illustrates the use of valves in combination to control a plurality of microfluidic channels, using logarithmic multiplexing. One can always control N lines individually using N separate valves, by opening or closing any individual valve as may be desired. However, when N becomes large, the number of valves and the number of control lines and control signals also becomes large. For micro-devices, the problems associated with numerous control lines are well known, and include difficulties in routing the control lines and the "real estate" or space on a chip that the control lines can consume. If only one fluid line in a group of N lines is active at a given time then one way to reduce the number of control lines and control signals is to build a multiplexer. There are two types of multiplexers possible—logarithmic and combinatorial. In both types, a single control signal can change the state of multiple valves at the same time. The logarithmic type is shown in FIG. 18, N control signals control $2^{(N/2)}$ flow channels, so that, in the example illustrated, 6 control signals are used to control 8 microfluidic channels, or flow lines. Using normally open valves, one could open flow line 1 by turning on control lines A1, C1 and E1, which closes all other lines. Using normally closed valves, one could open flow line 1 by turning on or activating control lines B1, D1, and F1, and each of the other flow lines would remain closed because each would have at least one valve in a closed state, since control lines A1 (lines 5-8), C1 (lines 3 and 4) and E1 (line 2) would be off and the corresponding valves as indicated would remain closed. Returning to using normally open valves, line 6 may be opened by activating control lines B1, C1 and F1 to close all of flow lines 1-5 and 7-8. In this example, every flow line may be opened individually using a combination of three control lines. However, this scheme allows for only one line open at given time and there is no way to keep two lines (for example 1 and 6) open simultaneously and all other lines closed.

Figure 19:
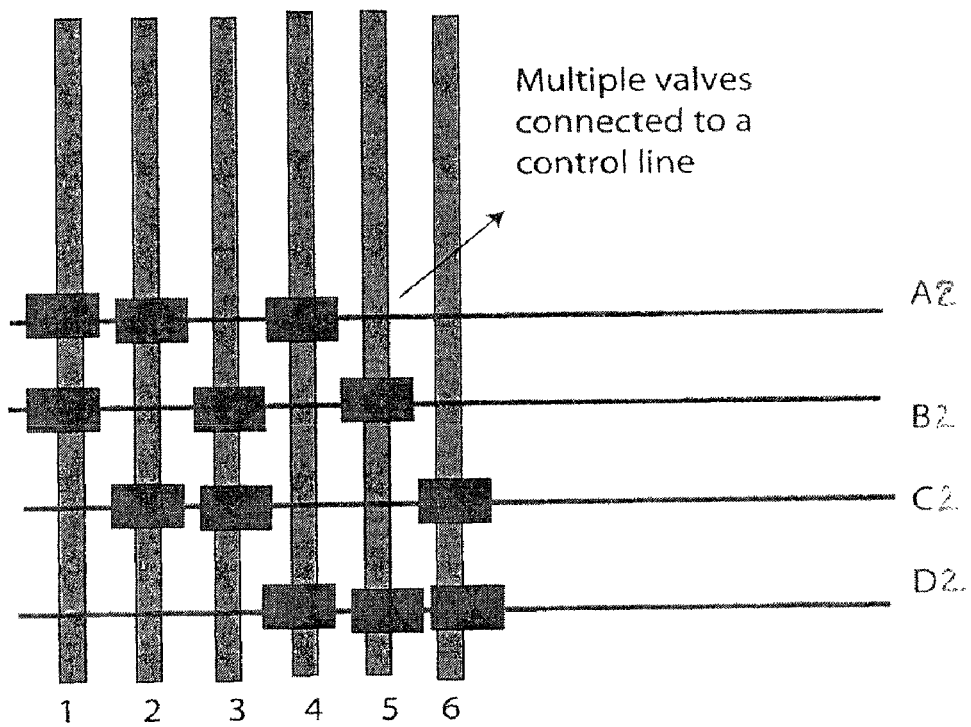
FIG. 19 is a schematic diagram in which 6 flow lines are controlled by 4 control lines using combinatorial methods, according to principles of the invention.

An alternative scheme involves combinatorial logic, which can offer some improvement in the numbers of flow lines that can be controlled in some instances. FIG. 19 is a schematic diagram in which 6 flow lines are controlled by 4 control lines using combinatorial methods. In a combinatorial process, N control lines can control $N!/((N/2)!\,^2)$ flow lines if N is even and can control $N!/[((N+1)/2)!\,((N-1)/2)!]$ flow lines if N is odd. Both the combinatorial expressions scale as $2^N$ for large N. In FIG. 19, flow channel 1 is open when C2 and D2 are on, flow channel 2 is open when D2 and B2 are on, and so forth. Again, as for the logarithmic multiplexing, only one line can be on at a given moment.

The multiplexer signals may be pneumatic or electronic or mechanical and it will make no difference to what has been described.

Deconvolver

Figure 20:
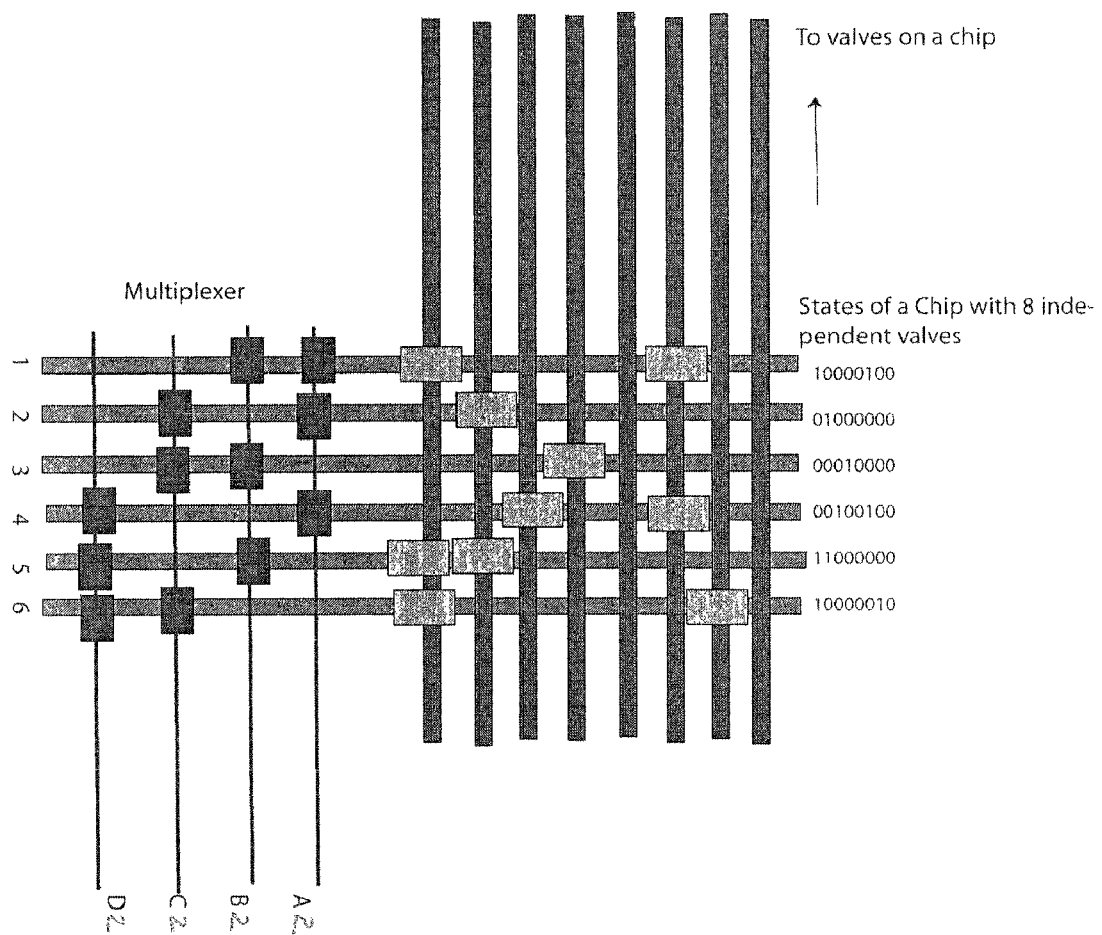
FIG. 20 is a schematic diagram of a deconvolver, which is a combination of a multiplexer and a representation of the states of a fluidic system, according to principles of the invention.

FIG. 20 is a schematic diagram of a deconvolver, which is a combination of the multiplexer of FIG. 19 and a representation of the states of a fluidic system. Consider a fluidic system such as a microfluidic chip having M valves. At any given time the state of a chip may be described by the state of its valves each of which may be open or closed. It may be that some valves operate in tandem and open or close at the same time. In that case, one can count these valves as just one valve. One can write the state of the chips as some binary number (e.g., 10000010 for M=8, see FIG. 20). The states of the system change as the system performs its designed task. However one binary number uniquely defines the state of the system at a given instant of time. One can represent each state by a set of valves on M control lines. In one embodiment, one can use a multiplexer to select that one state. As previously explained, this can be done because a multiplexer of the kind described before can select out one control channel.

This provides a way to reduce the number of control signals required to run a fluidic system. Any general fluidic system with M valves can be in a possible sum total of $2^M$ states. However to perform a particular task usually a fluidic chip will only need to cycle through a few states much smaller than $2^M$. A multiplexer in this case will reduce the number of control signals needed. As the number of valves on a chip grows this scheme provides significant numbers of state that can be controlled, as shown below in Table I.

TABLE I

| M | $2^M$ | N | Combinatorial |
|---|---|---|---|
| 1 | 2 | 1 | 1 |
| 2 | 4 | 2 | 2 |
| 3 | 8 | 3 | 3 |
| 4 | 16 | 4 | 6 |
| 5 | 32 | 5 | 10 |
| 6 | 64 | 6 | 20 |
| 7 | 128 | 7 | 35 |
| 8 | 256 | 8 | 70 |
| 9 | 512 | 9 | 126 |
| 10 | 1024 | 10 | 252 |
| 11 | 2048 | 11 | 462 |
| 12 | 4096 | 12 | 924 |
| 13 | 8192 | 13 | 1716 |
| 14 | 16384 | 14 | 3432 |
| 15 | 32768 | 15 | 6435 |
| 16 | 65536 | 16 | 12870 |
| 17 | 131072 | 17 | 24310 |
| 18 | 262144 | 18 | 48620 |
| 19 | 524288 | 19 | 92378 |
| 20 | 1048576 | 20 | 184756 |
| 50 | 1.13E+15 | 50 | 1.26E+14 |
| 100 | 1.27E+30 | 100 | 1.01E+29 |

As shown in Table I, 8 control signal lines can be used to represent 70 states. The number of states does not depend on the number M of actual valves on the chip, but rather only the maximum number of possible states, given by $2^M$, depends on the value of M.

One can think of the states of a chip as analogous to the instruction set of a microcontroller. Every microcontroller supports a certain instruction set. Each instruction in the set does some basic thing, such as add two numbers. An instruction in a high level computer language corresponds to a combination of one or more basic instructions of a processor, and the combination is designed to accomplish some task. In programming languages, one or more of these higher level tasks can be combined to make a program. In some embodiments, a microfluidic system can be constructed in analogy to the core of a microcontroller and the representation of the states corresponds to an instruction set. A "program" will then be just a particular sequence of states that the fluidic system will cycle through in order to achieve a task. In other words this is a way to make the fluidic equivalent of an IC microcontroller, with the logic being represented by the states of valves, and results being represented by the presence or absence of specific flows. Since such a device is a way to represent the states of a chip, we propose to call it a deconvolver, which is a combination of a multiplexer and a representation of the states of a fluidic system.

The actual fluidic processes take place in the fluidic core which is a dense system of valves and channels that can be used to perform a particular task. For instance the fluidic core may be configured to mix ingredients or perform a biological test. In some embodiments, sensors and/or cameras are provided to detect the results of the fluidic processing and feed a signal back to the microcontroller based on the output conditions that the sensors and/or camera sense. In this system the fluidic core and the deconvolver may be replaced with a different one for a different task, or the microcontroller can be programmed accordingly. The system can be modular, and at least some of the parts can be reconfigurable. In some embodiments, it is possible to define one or more standard "cells" that can be programmed to perform specific basic tasks.

It is also possible to use hydraulic actuation instead of using a pressure source. When the SMA wire pushes down a control channel closed at both ends and filled with a hydraulic liquid it can close a (indirect) valve elsewhere downstream of the wire by transmitting the pressure. This can avoid having to use a pressure source but has the negative effect of slowing down the speed of actuation. However, in some cases the speed may not be important.

General Purpose Programmable Computers

General purpose programmable computers useful for controlling instrumentation, recording signals and analyzing signals or data according to the present description can be any of a personal computer (PC), a microprocessor based computer, a portable computer, or other type of processing device. The general purpose programmable computer typically comprises a central processing unit, a storage or memory unit that can record and read information and programs using machine-readable storage media, a communication terminal such as a wired communication device or a wireless communication device, an output device such as a display terminal, and an input device such as a keyboard. The display terminal can be a touch screen display, in which case it can function as both a display device and an input device. Different and/or additional input devices can be present such as a pointing device, such as a mouse or a joystick, and different or additional output devices can be present such as an enunciator, for example a speaker, a second display, or a printer. The computer can run any one of a variety of operating systems, such as for example, any one of several versions of Windows, or of MacOS, or of Unix, or of Linux.

Machine-readable storage media that can be used in the invention include electronic, magnetic and/or optical storage media, such as magnetic floppy disks and hard disks; a DVD drive, a CD drive that in some embodiments can employ DVD disks, any of CD-ROM disks (i.e., read-only optical storage disks), CD-R disks (i.e., write-once, read-many optical storage disks), and CD-RW disks (i.e., rewriteable optical storage disks); and electronic storage media, such as RAM, ROM, EPROM, Compact Flash cards, PCMCIA cards, or alternatively SD or SDIO memory; and the electronic components (e.g., floppy disk drive, DVD drive, CD/CD-R/CD-RW drive, or Compact Flash/PCMCIA/SD adapter) that accommodate and read from and/or write to the storage media. As is known to those of skill in the machine-readable storage media arts, new media and formats for data storage are continually being devised, and any convenient, commercially available storage medium and corresponding read/write device that may become available in the future is likely to be appropriate for use, especially if it provides any of a greater storage capacity, a higher access speed, a smaller size, and a lower cost per bit of stored information. Well known older machine-readable media are also available for use under certain conditions, such as punched paper tape or cards, magnetic recording on tape or wire, optical or magnetic reading of printed characters (e.g., OCR and magnetically encoded symbols) and machine-readable symbols such as one and two dimensional bar codes.

Many functions of electrical and electronic apparatus can be implemented in hardware (for example, hard-wired logic), in software (for example, logic encoded in a program operating on a general purpose processor), and in firmware (for example, logic encoded in a non-volatile memory that is invoked for operation on a processor as required). The present invention contemplates the substitution of one implementation of hardware, firmware and software for another implementation of the equivalent functionality using a different one of hardware, firmware and software. To the extent that an implementation can be represented mathematically by a transfer function, that is, a specified response is generated at an output terminal for a specific excitation applied to an input terminal of a "black box" exhibiting the transfer function, any implementation of the transfer function, including any combination of hardware, firmware and software implementations of portions or segments of the transfer function, is contemplated herein.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

While the present invention has been particularly shown and described with reference to the structure and methods disclosed herein and as illustrated in the drawings, it is not confined to the details set forth and this invention is intended to cover any modifications and changes as may come within the scope and spirit of the following claims.

What is claimed is:

1. A microfluidic valve for controlling a flow of a fluid, comprising
   a substrate having at least two tie down points;
   adjacent said substrate, a microfluidic valve body constructed from an elastomeric material, said valve body having a flow channel configured to have therein a valve seat and a valve piston, said valve seat and said valve piston having a first relative position wherein said flow channel is in a first state and a second relative position wherein said flow channel is in a second state different from said first state;
   an actuator constructed from a shape memory alloy material, said actuator being attached at two of said at least two tie down points, said actuator configured to move said valve piston relative to said valve seat in response to an actuation signal so as to change the state of said flow channel from one of said first and second states to the other of said first and second states;
   a power supply configured to actuate said microfluidic valve;
   a supply of fluid configured to provide a flow though said microfluidic valve when at least partially open, and configured to provide a pressure at said microfluidic valve when closed;
   a control module configured to apply control signals to said power supply, and configured to supply control signals to said supply of fluid by way of a control channel; and
   a pneumatic valve responsive to a condition of said control channel, said pneumatic valve configured to control a state of said flow channel, wherein said actuator of said microfluidic valve for controlling said flow of said fluid is situated at a distance from said flow channel, said distance calculated to limit a change in temperature of said actuator from affecting a thermal condition in said flow channel;
   wherein said microfluidic valve provides fluidic logic signals as output in response to control signals applied by said control module.

2. The microfluidic valve for controlling a flow of a fluid of claim 1, wherein said first state and said second state are selected from the group consisting of a fully open state, a partially open state, and a closed state.

3. The microfluidic valve for controlling a flow of a fluid of claim 1, wherein the actuator is attached to at least one tie down location with solder.

4. The microfluidic valve for controlling a flow of a fluid of claim 1, wherein said actuator constructed from said shape memory alloy material is a wire.

5. The microfluidic valve for controlling a flow of a fluid of claim 1, wherein said actuation signal is an electrical signal.

6. The microfluidic valve for controlling a flow of a fluid of claim 1, wherein said actuation signal is an illumination signal.

7. The microfluidic valve for controlling a flow of a fluid of claim 1, further comprising a block situated between said actuator and said flow channel, said block configured to transmit a force to said flow channel in response to said actuation signal.

8. The microfluidic valve for controlling a flow of a fluid of claim 1, wherein at least one of said valve seat and said valve piston is a wall of said flow channel.

9. The microfluidic valve of claim 1, further comprising:
   in said microfluidic valve for controlling a flow of a fluid, a block situated between an actuator and a flow channel, said block configured to transmit a force to said flow channel in response to an actuation signal.

10. The microfluidic valve of claim 1, wherein
    said actuator is configured to operate a plurality of said microfluidic valves simultaneously in response to a single actuation signal.

11. An apparatus for performing material processing operations in a microfluidic environment, comprising:
    at least one microfluidic valve for controlling a flow of a fluid; said at least one microfluidic valve comprising a substrate having at least two tie down points;
    adjacent said substrate, a microfluidic valve body constructed from an elastomeric material, said valve body having a flow channel configured to have therein a valve seat and a valve piston, said valve seat and said valve piston having a first relative position wherein said flow channel is in a first state and a second relative position wherein said flow channel is in a second state different from said first state;
    an actuator constructed from a shape memory alloy material, said actuator being attached at two of said at least two tie down points, said actuator configured to move said valve piston relative to said valve seat in response to an actuation signal so as to change the state of said flow channel from one of said first and second states to the other of said first and second states;

a power supply configured to actuate said at least one microfluidic valve;

at least one supply of fluid configured to provide a flow though said at least one microfluidic valve when at least partially open, and configured to provide a pressure at said at least one microfluidic valve when closed, said supply of fluid containing material to be processed;

a control module configured to apply control signals to said power supply, and configured to supply control signals to said supply of fluid by way of a control channel; and a pneumatic valve responsive to a condition of said control channel, said pneumatic valve configured to control a state of said flow channel, wherein said actuator of said one of said at least one microfluidic valve for controlling said flow of said fluid is situated at a distance from said flow channel, said distance calculated to limit a change in temperature of said actuator from affecting a thermal condition in said flow channel.

wherein said microfluidic apparatus provides processed fluid as output in response to control signals applied by said control module.

12. The apparatus for performing material processing operations in a microfluidic environment of claim 11, further comprising:

in at least one of said at least one microfluidic valve for controlling a flow of a fluid, a block situated between an actuator and a flow channel, said block configured to transmit a force to said flow channel in response to an actuation signal.

13. The apparatus for performing material processing operations in a microfluidic environment of claim 11, wherein said actuator is configured to operate a plurality of said microfluidic valves simultaneously in response to a single actuation signal.

14. The apparatus for performing material processing operations in a microfluidic environment of claim 11, further comprising:

a sensor configured to sense an output signal from said at least one processed fluid, said output signal representative of information derived from said processed fluid and having significance to a user of said apparatus; and an output module configured to perform at least one of recording and displaying said output signal representative of information derived from said processed fluid and having significance to a user of said apparatus.

* * * * *